United States Patent Office 3,479,338
Patented Nov. 18, 1969

3,479,338
PROCESS FOR THE PREPARATION OF ANHYDROUS AMPICILLIN USING SILYLATED AMPICILLIN ACID SALT
Arthur C. Adams, West Chester, Pa., assignor to American Home Products Corporation, New York, N.Y., a corporation of Delaware
No Drawing. Filed Oct. 2, 1967, Ser. No. 671,965
Int. Cl. C07d 99/14
U.S. Cl. 260—239.1                 5 Claims

ABSTRACT OF THE DISCLOSURE

Anhydrous ampicillin is prepared in high yields without the need to isolate and use crystalline hydrated forms or complex, insoluble salts as precursors by a process comprising (A) alcoholyzing a silylated ampicillin hydrohalide; and (B) reacting the intermediate of Step (A) with a tri(lower)alkylamine to form ampicillin base; or (A$^1$) reacting a silylated ampicillin hydrohalide with a tri(lower)alkylamine to form a silylated ampicillin base; and (B$^1$) alcoholyzing the intermediate of Step (A$^1$) to form ampicillin base; (C) preparing a mixture comprising (1) the ampicillin base from Step (B) or Step (B$^1$) and (2) an at least partially water-miscible organic solvent with a controlled amount, i.e., at least about 10% by weight of water, based on solids and total water, bound and free, present; and (D) heating the mixture of 50–100° C. to obtain crystalline anhydrous ampicillin.

---

This invention relates to the production of derivatives of penicillanic acid and more particularly to a novel method for converting an acid addition salt of a silylated D-6-(2-amino-2-phenylacetamido)penicillanic acid to anhydrous ampicillin.

BACKGROUND OF THE INVENTION

The compound D - 6 - (2 - amino - 2 - phenylacetamido) pencillanic acid per se, also known by the generic term "ampicillin," is of proven value in its broad spectrum antibacterial activity and is useful as a therapeutic agent in poultry and mammals, and particularly in man, in the treatment of infectious diseases caused by Gram-positive and Gram-negative bacteria, upon parenteral or oral administration. It also has use as a nutritional supplement in animal feed.

Ampicillin exists in several hydrated crystalline forms, as well as in anhydrous crystalline form. One hydrated form, the monohydrate, is known to the art from the disclosure in F. P. Doyle, J. H. C. Nayler and H. Smith, U.S. 2,985,648, in which is taught relatively complex method for the preparation thereof. Another form of ampicillin, the trihydrate, is described and characterized in H. E. Alburn and N. H. Grant, U.S. 3,299,046. Still another crystalline form of ampicillin is the substantially anhydrous form, described, characterized and claimed by N. H. Grant and H. E. Alburn in U.S. 3,144,445. The present invention is concerned with this anhydrous form of ampicillin.

Anhydrous ampicillin often is desired instead of the hydrated forms, because of its unexpectedly highly advantageous storage stability characteristics. Because of this stability, coupled with its denseness, the efficiency of production of the anhydrous compound in capsule dosage form in increased. As a further advantage, linked to its lesser solubility in water, anhydrous ampicillin exhibits slower absorption in the gut and hence provides prolonged blood levels and more effective action against intestinal pathogens than do the hydrated ampicillins. These factors, including antibiotic utility in human therapy, are discussed in the aforementioned U.S. 3,144,445.

Several means for the preparation of anhydrous ampicillin are known in the art. The means selected has depended on the precursor, which in all cases has been a crystalline hydrate of ampicillin. For example, as is disclosed in U.S. 3,144,445, when the precursor comprises crystalline ampicillin monohydrate, one admirably suitable means comprises heating the crystalline hydrate in the presence of free water at a temperature of from 40° C. to about 100° C. until the anhydrous ampicillin crystals are formed. The heating may best be carried out with the charge of hydrated ampicillin crystals plus water at a pH of from about 3.0 to 7.0. Preferably the free water is present in an amount that is at least 50% by weight of the charge, and the heating is applied to the charge under vacuum until the dry anhydrous ampicillin product is obtained. In an alternative procedure, the required heat and water may be supplied by directly steaming crystals of ampicillin monohydrate. When, on the other hand, the precursor comprises crystalline ampicillin trihydrate, the above-outlined method is not effective, and a means such as that disclosed in the aforesaid U.S. 3,299,046 is employed. This comprises, generally, preparing a mixture of the crystalline trihydrate, at least some free water, and a water-miscible organic solvent and heating the mixture to a temperature of from about 50° C. to about 100° C., then recovering the crystalline anhydrous form. Any of the mentioned procedures require the use of isolated crystalline hydrates of ampicillin and the isolation of these from the dilute mixtures after their synthesis represents costly and time-consuming processing operations because of the relatively large amounts of water (and, in some cases, organic solvents) to be removed before crystallization. Most of the earlier methods for isolation of the crystalline hydrates involved evaporation of large volumes of water (or solvent) at low temperature—for example, freeze-drying is used on a small scale. In more recent procedures, the crystalline hydrates are recovered by treatment of the dilute solution of ampicillin with an acid, such as an aryl-sulfonic acid, for example, β-naphthalene sulfonic acid, forming an addition salt which precipitates from the dilute reaction mixture and from which the hydrated ampicillin can be recovered by acidification, reconstitution of the precipitate and decomposition of the salt. It is noteworthy also to mention that even with the more recent acid precipitation procedure the crystalline trihydrate of ampicillin is extremely difficult (slow) to filter and this often tends to slow down production of the anhydrous form if the trihydrate is used as a precursor, especially on a large scale. Furthermore, if the trihydrate is the precursor, sometimes there is observed the tendency for the mixture to become thick and gelatinous. It would be desirable therefore to provide a means to obtain anhydrous ampicillin which does not require the use of an isolated crystalline hydrated ampicillin or of an insoluble complex salt, such as a β-naphthalene sulfonate, as a precursor. It has surprisingly and unexpectedly now been found that, if the means of the instant invention is used, an acid addition salt of a silylated ampicillin can be converted directly from the intermediate formed in the acylation mixture, into crystalline anhydrous ampicillin, and in higher yields than generally is possible starting from hydrated crystalline precursors.

It is, accordingly, a primary object of the instant invention to provide crystalline anhydrous ampicillin in good yield and in a high state of purity.

It is a further object to provide crystalline anhydrous ampicillin without the need to isolate and use crystalline hydrated ampicillins as precursors.

Still another object of the instant invention is to provide crystalline anhydrous ampicillin by a means which avoids the need to use complex and expensive acid addition salts of ampicillin as precursors.

A further object of the instant invention is to provide crystalline anhydrous ampicillin by a means which avoids the need to isolate and use the crystalline trihydrate of ampicillin as a precursor.

Still another object of the present invention is to provide crystalline anhydrous ampicillin by treating an intermediate in an acylation mixture in which ampicillin is prepared.

DESCRIPTION OF THE INVENTION

These and other objects readily apparent to those skilled in the art are easily achieved by practice of the means of the instant invention which is, in essence: a method for the preparation of the crystalline anhydrous form of D-6-(2-amino-2-phenylacetamido)penicillanic acid starting with an acid addition salt of a silylated ampicillin precursor of Formula I:

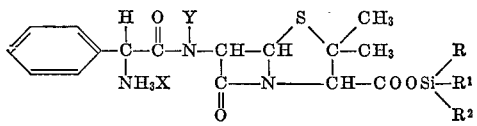

wherein X is chlorine or bromine; Y is H or

and R, $R^1$ and $R^2$ are (lower)alkyl, which method comprises:

(A) Alcoholizing said precursor with an alcohol of the formula $$R^3OH$$

wherein $R^3$ is (lower)alkyl, until formation of the corresponding acid addition salt of ampicillin and the corresponding alkoxytri(lower)alkylsilane are substantially complete; and (B) Reacting said acid addition salt of ampicillin from step (A) with at least about 1 equivalent of a tri(lower)alkylamine, based on said salt, until formation of ampicillin base and an acid addition salt of said tri(lower)alkylamine is substantially complete; or ($A^1$) reacting said precursor with at least about 1 equivalent of a tri(lower)alkyl amine, based on said precursor, until formation of the corresponding silylated ampicillin base and an acid addition salt of said tri(lower)alkylamine is substantially complete; and ($B^1$) alcoholyzing said silylated ampicillin base from step ($A^1$) with an alcohol of the formula $$R^3OH$$

wherein $R^3$ is as hereinabove defined, until formation of ampicillin base and the corresponding alkoxy tri(lower)alkylsilane are substantially complete;

(C) Preparing a mixture comprising (1) the ampicillin base from step (B) or step ($B^1$) and (2) a reaction medium comprising, (a) a water-miscible organic solvent capable of dissolving at least 5% thereof of water, and present in an amount that is at least 20% by volume of said medium, and (b) sufficient free water in the mixture to bring the total amount of bound and free water in the mixture to at least about 10% by weight based on solids and total water present; and (D) Heating said mixture at a temperature of from about 50° C. to about 100° C. until formation of crystalline anhydrous ampicillin is substantially complete.

Special mention is made of a number of valuable embodiments of this invention. These are:

A process as first above defined wherein said precursor is in the form of an acid addition salt with hydrogen chloride, said alcohol is isopropanol and said tri(lower)-alkylamine is triethylamine.

A process as first above defined wherein, in Step (C), said water-miscible organic solvent comprises from about 50% to about 95% by volume of said medium and said heating occurs in the temperature range of from about 60° C. to about 85° C.

A process as first above defined wherein, the Step (C) said water-miscible organic solvent is isopropanol which comprises about 85% by volume of said medium and said heating occurs in the temperature range of from about 80° C. to about 85° C.

A process as first above defined wherein, in Step (A) the hydrochloric acid addition salt of D-6-trimethylsilyl-6-(2-amino-2-phenylacetamido)penicillanic acid trimethylsilyl ester is alcoholyzed with isopropanol to form ampicillin hydrochloride and isopropoxy trimethylsilane; in Step (B) the ampicillin hydrochloride of Step (A) is reacted with triethyl amine to form ampicillin base and triethylamine hydrochloride; in Step (C) a mixture of the ampicillin base and 85% aqueous isopropanol is prepared; in Step (D) said mixture is heated at from 75° C. to 80° C. until formation of the crystalline anhydrous form of ampicillin is substantially complete.

As an aid to the understanding of the embodiments broadly contemplated to be within the scope of the instant process, the attention of those skilled in the art is directed to the following flow diagram showing the elements of the method designated by symbols used herein and in the appended claims:

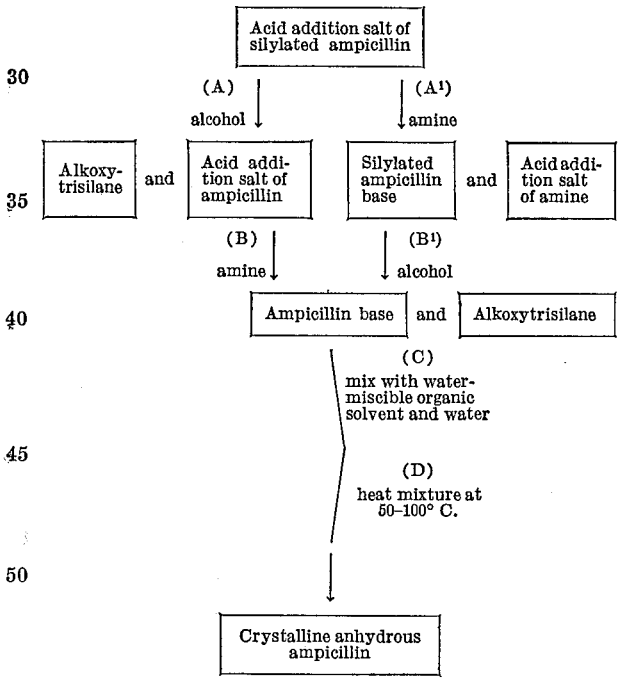

Referring to the diagram, those skilled in the art will perceive immediately that the precursor acid addition salt of silylated ampicillin in the box at the top may be (I) Treated with base and alcoholized then mixed with water-miscible organic solvent and water, and heated (($A^1$)–($B^1$)–(C)–(D)); or (II) Alcoholyzed and treated with base then mixed with water-miscible organic solvent and water, and heated ((A)–(B)–(C)–(D)).

Both pathways, I–II, inclusive, provide the valuable objects of the instant invention in an efficient manner.

The acid addition salts of mono- and di(tri(lower)-alkyl)silylampicillin of Formula I used as starting materials in the instant process can be prepared in a variety of ways. For example, 6-aminopenicillanic acid (6-APA), which is an item of commerce, can be reacted, preferably in the presence of an acid binding agent, with a tri(lower) alkylhalosilane or with a tri(lower)alkylsilazane, or with a tri(lower)alkylsilylamine until formation of a silylated 6-APA is substantially complete according to procedures fully described and exemplified in S. Herrling and H.

Mueckter, U.S. 3,249,622. Depending, of course, on the amount of reagents employed, those skilled in the art will be able to obtain monosilylated-, disilylated-6-APA's and mixtures thereof, if desired. The silylated 6-APA's then are reacted with an appropriate acylating agent such as a reactive derivative of D-α-aminophenylacetic acid, such as a carboxylic acid halide or a carboxylic acid halide hydrohalide until formation of the acid addition salt of silylated ampicillin is substantially complete.

Particularly useful techniques for converting 6-APA to silylated derivatives, then transforming these to acylated silylated compounds suitable as precursors in the instant invention are described in detail in Irish Patent No. 102/63 (7436) Mar. 27, 1963. One especially convenient means to prepare the acid addition salt of the silylated ampicillin used as a starting material in the instant process is exemplified in detail hereinafter.

When used herein and in the appended claims the term "(lower)alkyl" contemplates alkyl groups, straight and branched chain, of from about 1 to about 6 carbon atoms. Illustrative (lower)alkyl groups are methyl, ethyl, n-propyl, i-propyl, n-butyl, t-butyl, n-pentyl, 2-methylpentyl, n-hexyl and the like. The term "tri(lower)alkylamine" when used herein and in the appended claims contemplates tertiary amines tri-substituted with (lower) alkyl groups as above defined. Illustrative of said amines therefore are trimethylamine, triethylamine, tri-n-propylamine, tri-n-butylamine, tri-n-pentylamine, tri-n-hexylamine, tri-(3-methylpentyl)amine, and the like. Especially preferred is triethylamine. Alcoholysis of the silylampicillin in Step (A) or Step (B$^1$) is carried out with an alcohol of the formula, R$^3$OH, wherein R$^3$ is (lower)alkyl as above defined. Illustrative of suitable alcohols, therefore, are methanol, ethanol, n-propanol, i-propanol, n-butanol, t-butanol, n-pentanol, n-hexanol, 3-methylpentanol, and the like. Especially preferred is isopropanol.

With respect to the reaction medium in Steps (C) and (D) it has been discovered that the environment should contain in addition to water, an organic solvent, which is preferably entirely miscible with water, or partially miscible with water at least to the extent that the organic solvent will retain 5% by volume of water in solution. For example, acetone, ethanol, isopropanol, n-propanol, n-butanol, ethylene glycol, ethylene glycol monomethyl ether, and dioxane, which meet the aforesaid requirements with respect to miscibility with water, have been found to be eminently suitable for use as the requisite organic solvent, and, in certain instances, even when included in proportions up to 95% of the aqueous environment. However, with respect to the last, it has been found that the total water present in the processing mixure containing the acid addition salt solids and furnished as both free and chemically bound water, must constitute at least about 10% by weight based on solids and total water present to obtain the desired conversion to the crystalline anhydrous ampicillin. On the other hand when the organic solvent is present in the environment of Step (C) in concentrations of less than 20% by volume of said environment, the salutary effect of the solvent for permitting transformation of the acid addition salt to the desired crystalline anhydrous ampicillin is not in evidence.

When an organic solvent of suitable water miscibility is selected and sufficient water is totally available in the bound and free state, as referred to above; it has been found that conversion of the D-6-(2-amino-2-phenylacetamido)penicillanic acid from Step (B) or Step (B$^1$) to the crystalline anhydrous form of ampicillin may be carried out within the pH range of from about 5.5 to about 8.5 (provided there is sufficient water present to render a pH determination possible). Optimum conversion yields appear to occur when the pH is maintained within the middle portion of the range although control of the pH is not absolutely necessary to operability of the method other than at a higher pH than 8.5 destruction of the penicillin nucleus tends to occur. Conversion itself is caused to occur by maintaining the organic solvent, water and the said ampicillin base systems described within the temperature range of from about 50° C. to about 100° C.

As has been mentioned hereinabove in connection with disclosure of the specific embodiments, and as will be obvious to those skilled in the art after considering the instant disclosure, a number of different ways of carrying out the instant process can be used without departing from the scope or spirit of the invention. Merely by way of illustration, in Step (A) or Step (A$^1$) the starting material, the acid addition salt of silylampicillin can be alcoholized or treated with amine in situ in the acylating mixture in which it is prepared or; it can be isolated then alcoholized (if Step (A) is used) in an excess of the alcohol as a diluent, or in either Step (A) or Step (B) it can be dissolved or suspended in an inert diluent, such as tetrahydrofuran, acetonitrile, benzene, hexane, heptane and the like and then alcoholized or treated with amine. Step (B) can be carried out in a number of ways, for example, the tri(lower) alkylamine can be added to the alcoholysis mixture from Step (A). If this is done, somewhat more than 1 molar equivalent of amine based on the ampicillin hydrochloride is used since the weak base ·HX salt remaining from the preparation of silyl ampicillin reacts with an equivalent amount of tri(lower)alkylamine to liberate the weak base and tri(lower)alkylamine·HX. If this modification is used the ampicillin separates as a solid and it is filtered off, then mixed and heated in Steps (C) and (D), with the water miscible organic solvent and the controlled amount of water (a) and (b) described hereinabove and exemplified hereinafter. The product, anhydrous ampicillin, is recovered in crystalline form from the mixture from Step (D). The crystals are recovered by filtering the hot reaction mixture and are washed, if desired with a solvent, such as 85% isopropanol, then dried.

DESCRIPTION OF THE PREFERRED EMBODIMENTS

The following examples illustrate the best mode contemplated of using the claimed processes of the invention. They are merely illustrative and are not to be construed as limiting the scope of the claims in any manner whatsoever.

EXAMPLE 1

Sequence (A)–(B)–(C)–(D)

*Trimethylsilylated ampicillin hydrochloride.*—Dried 6-aminopenicillanic acid, 43.2 g., 0.2 mole, is mixed with 87.8 g., 0.6 mole, of N-trimethylsilyl diethylamine and heated with stirring, a slow stream of dry nitrogen being passed through the reaction mixture. At 60 to 70° C. a rapid dissolution of the 6-aminopenicillanic acid occurs and at 80° C. a liquid starts to distill over. After 20 minutes the temperature is gradually raised to 150° C. and held there for 5 minutes in order to complete the reaction. The total reaction time is 45 minutes. The reaction mixture is then allowed to cool to 80° C., whereafter all volatile components are distilled off, finally in vacuum, leaving behind 6–N–trimethylsilylaminopenicillanic acid trimethylsilylester as a thick brownish oil. This is dissolved in 250 ml. of dry tetrahydrofuran together with 33 g., 0.254 mole, of redistilled quinoline and chilled in ice. D-α-aminophenylacetic acid chloride hydrochloride, 55.5 g., 0.27 mole, then is added with stirring in portions during 10 minutes. During addition the temperature rises to about 10° C. The mixture is stirred for an additional 40 minutes at 22° C. and filtered.

(A) *Alcoholysis.*—One hundred fifty ml. of anhydrous isopropanol is added to an aliquot of the filtrate containing 0.10 mole of silylated ampicillin hydrochloride, at about 22° C. with stirring. The reaction is almost instantaneous.

(B) *Ampicillin base.*—Slowly, 30 ml., 0.22 mole, of triethylamine is added with stirring. After stirring for 15 minutes, during which time the thick slurry becomes fluid, the solid ampicillin base is separated by filtration.

(C)–(D) Anhydrous ampicillin.—To 150 ml. of 85% aqueous isopropanol in a 1 l., 3-necked flask fitted with stirrer, thermometer and reflux condenser, the wet filter cake is added portionwise at 65–70° C., with vigorous stirring. Heating at 75–80° C. is maintained for 15 minutes. Crystalline anhydrous ampicillin separates.

The heating is continued at 75–80° C. while 40 ml. of solvent distills off. The white, crystalline anhydrous ampicillin is filtered from the hot reaction mixture, washed with 85% aqueous isopropanol and dried at 45° C., yield, 28 g.; iodometric assay, 1010 mcg./per mg.; bioassay, 933 mcg. per mg.

EXAMPLE 2

The procedure of Example 1 is repeated making, respectively, the following specified process modifications:

(1) In Step (A) D-6-trimethylsilyl-6-(2-amino-2-phenylacetamido)penicillanic acid trimethylsilyl ester hydrobromide is substituted for the corresponding hydrochloride.

(2) In Step (A), anhydrous methanol and anhydrous n-hexanol are substituted for anhydrous isopropanol.

(3) In Step (A) D-6-tri-n-hexylsilyl-6-(2-amino-2-phenylacetamido)penicillanic acid tri-n-hexylsilyl ester hydrochloride is substituted for the corresponding trimethylsilylampicillin.

(4) In Step (B), trimethylamine and tri-n-hexylamine are substituted for triethylamine.

(5) Step (C) is carried out substituting acetone, ethanol, n-propanol, n-butanol, ethylene glycol, ethylene glycol monomethyl ether and dioxane for isopropanol; adding to the mixtures enough free water to provide 10% by weight of water based on the solids and total water present.

(6) Step (D) is carried out by heating the mixture at 50° C., 60° C., 85° C., and at 100° C.

(7) Step (C) is carried out with isopropanol present in an amount sufficient to provide 50% and 95% by volume of the total reaction mixture.

Anhydrous ampicillin is obtained in substantially the same manner as in Example 1.

EXAMPLE 3

Sequence (A¹)–(B¹)–(C)–(D)

The filtrate containing 0.10 mole of silylated ampicillin hydrochloride prepared as described in Example 1 is used as starting material.

(A¹) Reaction with base.—Slowly, with stirring, 30 ml., 0.22 mole, of triethylamine is added. The mixture is stirred for an additional 15 minutes.

(B¹) Alcoholysis.—One hundred fifty ml. of anhydrous isopropanol is added to the filtrate at about 22° C., with stirring. The reaction is almost instantaneous. The solid ampicillin base is separated by filtration.

(C)–(D) Anhydrous ampicillin.—To 150 ml. of 85% aqueous isopropanol in a 1 l., 3-necked flask fitted with stirrer, thermometer and reflux condenser, the wet filter cake is added portionwise at 65–70° C., with vigorous stirring. Heating at 75–80° C. is maintained for 15 minutes. Crystalline anhydrous ampicillin separates.

The heating is continued at 75–80° C. while 40 ml. of solvent distills off. The white, crystalline anhydrous ampicillin is filtered from the hot reaction mixture washed with 85% aqueous isopropanol and dried at 45° C.

EXAMPLE 4

Sequence (A¹)–(B¹)–(C)–(D) (alternative)

Silylated ampicillin hydrochloride, 0.1 mole, prepared as described in Example 1, is mixed with 300 ml. of acetonitrile and the mixture is used as starting material.

(A¹) Reaction with base.—Slowly, with stirring, 30 ml., 0.22 mole, of triethylamine is added. The reaction mixture is stirred for about 5 minutes.

(B¹) Alcoholysis.—Two hundred ml. of anhydrous isopropanol is added to the mixture of Step (A¹) at about 22° C., with stirring. The reaction is almost instantaneous.

(C)–(D) Anhydrous ampicillin.—The mixture from Step (B¹) is heated to 65–70° C. and 36 ml. of water is added. Heating is continued at 75–77° C. for 10 minutes. Crystalline anhydrous ampicillin separates.

The white solid is filtered off of the hot mixture from Step (D) and washed twice with 50 ml. of 85% aqueous isopropanol, then air-oven dried. There is obtained 24.7 g. of crystalline anhydrous ampicillin.

What is claimed is:

1. In a method for the preparation of the crystalline anhydrous form of D-6-(2-amino-2-phenylacetamido)-penicillanic acid starting with an acid addition salt of a silylated ampicillin precursor of the formula

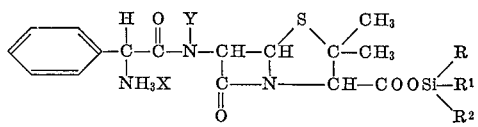

wherein X is chlorine or bromine; Y is H or

and R, R¹ and R² are (lower)alkyl, and:

(A) alcoholizing said precursor with an alcohol of the formula

R³OH wherein R³ is (lower)alkyl, until formation of the corresponding acid addition salt of ampicillin and the corresponding alkoxy-tri(lower)alkylsilane are substantially complete; then (B) reacting said acid addition salt of ampicillin from step (A) with at least about 1 equivalent of a tri(lower)alkylamine, based on said salt, until formation of ampicillin base and an acid addition salt of said tri(lower)alkylamine is substantially complete; or (A¹) reacting said precursor with at least aobut 1 equivalent of a tri(lower)alkyl amine, based on said precursor, until formation of the corresponding silylated ampicillin base and an acid addition salt of said tri(lower)alkylamine is substantially complete; then (B¹) alcoholizing said silylated ampicillin base from step (A¹) with an alcohol of the formula

R³OH wherein R³ is as hereinabove defined, until formation of ampicillin base and the corresponding alkoxy tri(lower)alkylsilane are substantially complete; the improvement which comprises (C) preparing a mixture comprising (1) the ampicillin base from step (B) or step (B¹) and (2) a reaction medium comprising, (a) a water-miscible organic solvent capable of dissolving at least 5% thereof of water, and present in an amount that is at least 20% by volume of said medium, and (b) sufficient free water in the mixture to bring the total amount of bound and free water in the mixture to at least about 10% by weight based on solids and total water present; and (D) heating said mixture to a temperature of from about 50° C. to about 100° C. until formation of crystalline anhydrous ampicillin is substantially complete.

2. A method as defined in claim 1 wherein said precursor is in the form of an acid addition salt with hydrogen chloride said alcohol is isopropanol and said tri(lower)alkylamine is triethylamine.

3. A method as defined in claim 1 wherein, in step (C), said water-miscible organic solvent comprises from about 50% to about 95% by volume of said medium and said heating occurs in the temperature range of from about 60° C. to about 85° C.

4. A method as defined in claim 1 wherein, in step (C), said water-miscible organic solvent is isopropanol which comprises about 85% by volume of said medium and said heating occurs in the temperature range of from about 80° C. to about 85° C.

5. A method as defined in claim 1 wherein, in Step (A) the hydrochloric acid addition salt of D-6-trimethylsilyl-6-(2-amino-2-phenylacetamido)penicillanic acid trimethylsilyl ester is alcoholyzed with isopropanol to form ampicillin hydrochloride and isopropoxy trimethylsilane; in Step (B) the ampicillin hydrochloride of Step (A) is reacted with triethylamine to form ampicillin base and triethylamine hydrochloride; in Step (C) a mixture of the ampicillin base and 85% aqueous isopropanol is prepared; and in Step (D) said mixture is heated at from 75° C. to 80° C. until formation of the crystalline anhydrous form of ampicillin is substantially complete.

References Cited
UNITED STATES PATENTS 3,249,622   5/1966   Herrling et al. _____ 260—239.1

NICHOLAS S. RIZZO, Primary Examiner